United States Patent
Khajezadeh

[11] 3,881,181
[45] Apr. 29, 1975

[54] SEMICONDUCTOR TEMPERATURE SENSOR

[75] Inventor: Heshmat Khajezadeh, Somerville, N.J.

[73] Assignee: RCA Corporation, New York, N.Y.

[22] Filed: Feb. 22, 1973

[21] Appl. No.: 334,660

[52] U.S. Cl. ................ 357/69; 357/28; 357/71; 357/74; 357/81; 357/82; 73/362; 338/22; 338/25
[51] Int. Cl. .............................. H01l 5/00; H01l 3/00
[58] Field of Search ......... 317/234, 29, 29.1, 1, 5.3, 317/4; 123/26; 324/92; 73/362 SC; 338/22 R, 25

[56] References Cited
UNITED STATES PATENTS

| | | | |
|---|---|---|---|
| 3,406,366 | 10/1968 | Kontrimas et al. | 317/234 |
| 3,426,252 | 2/1969 | Lepselter | 317/234 L |
| 3,484,658 | 12/1969 | Komatsu | 317/235 Q |
| 3,491,325 | 1/1970 | Hu | 338/22 R |
| 3,717,564 | 2/1973 | Bhatt | 317/235 E |
| 3,729,662 | 4/1973 | Langdon | 317/235 E |
| 3,733,897 | 5/1973 | Herzl | 73/362 SC |

FOREIGN PATENTS OR APPLICATIONS

| | | | |
|---|---|---|---|
| 1,053,926 | 1/1967 | United Kingdom | 338/22 R |
| 1,099,888 | 3/1955 | France | 317/234 G |

OTHER PUBLICATIONS

IBM Technical Disclosure Bulletin; *Semiconductor Temperature Sensor;* By Gardner; Vol. 8, No. 3 Aug. 65.

*Primary Examiner*—Andrew J. James
*Attorney, Agent, or Firm*—H. Christoffersen; R. P. Williams; T. H. Magee

[57] ABSTRACT

A semicondcutor device adapted for use as a temperature sensor, e.g., in a flowing fluid medium for sensing changes in the flow rate of the medium, includes a temperature sensitive resistor comprising a region of semiconductive material of uniform resistivity. Beam leads make electrical connection to the resistor and are adapted to provide rugged structural support for the device within the fluid medium.

8 Claims, 2 Drawing Figures

SEMICONDUCTOR TEMPERATURE SENSOR

This invention relates to semiconductor temperature sensors and, more particularly, to a semiconductor temperature sensitive resistor adapted for use, for example, in a flowing fluid such as air in a carburetor of an internal-combustion engine to measure changes in the rate of flow of the fluid by sensing changes in the temperature of the resistor.

It is generally known to measure the flow of a fluid by placing a temperature sensitive resistor in the fluid and measuring the changes in resistance of the resistor as indicative of changes in the rate of flow of the fluid. Such a temperature sensitive resistor should exhibit a high ratio of resistance change to temperature change. One form of sensor useful for this purpose is the so-called hot wire anemometer in which a metal wire is heated in a flowing fluid by passing a current through the wire and then measuring changes in the current through the wire as a measure of changes in the temperature of the wire, and hence the flow rate of the fluid. Such devices consume substantial amounts of power and are not adapted for reliable use where mechanical vibration is present, such as in automotive vehicles, for example.

Temperature sensitive resistors comprising diffused regions of semiconductive material are known, but these devices have exhibited relatively low values of the ratio of change in resistance to change in temperature. Moreover, like the hot wire anemometer, these devices have not been rugged enough for use in high vibration environments.

In the drawings:

FIG. 1 is taken on the line 1—1 of FIG. 2.

Figure 1:
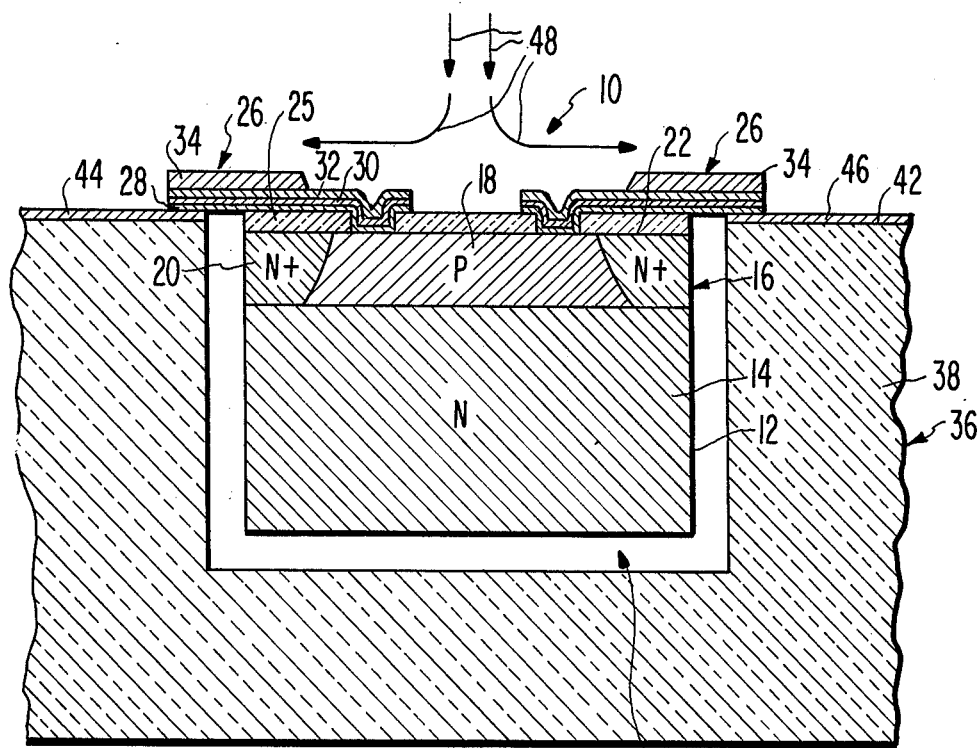
FIG. 1 is a cross-section through the present temperature sensor showing its internal construction and illustrating the novel manner of supporting the device in the medium being sensed.

The present novel semiconductor temperature sensor is designated generally at 10 in the drawings. The sensor 10 includes a body 12 of semiconductive material, e.g. silicon, which, in the preferred form of the device, includes a substrate 14 of one type conductivity carrying an epitaxial layer 16 which is, as it is initially formed, of conductivity type opposite to that of the substrate 14 throughout its volume. In this example, the substrate 14 is of N type conductivity, and the epitaxial layer 16 is of P type conductivity.

Figure 2:
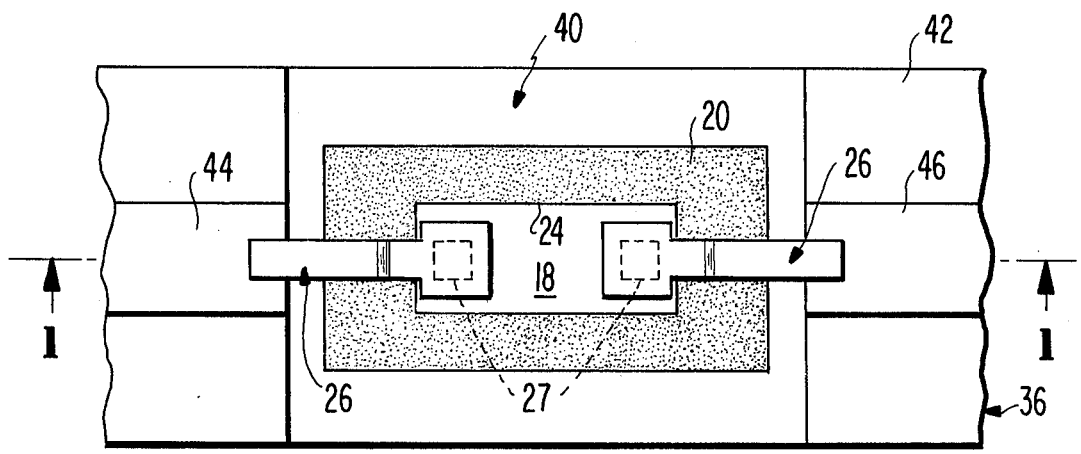
FIG. 2 is a plan view of the device and supporting structure.

A resistor region 18, which is part of the epitaxial layer 16, acts as the temperature sensing medium of the device. Preferably, the resistor region 18 is rectangular, having a predetermined length, width, and thickness. All these dimensions may vary depending on the average resistance value desired for the region 18. The thickness of the region 18 is simply the thickness of the epitaxial layer 16 and may be in the range of from about one micrometer to about 20 micrometers. To define the length and width of the region 18, a frame zone 20, of N+ type conductivity, is in the epitaxial layer 16 and extends from the upper surface 22 of the epitaxial layer 16 through the epitaxial layer to the substrate 14. The frame zone 20 has an internal boundary 24 (FIG. 2) the configuration of which establishes the length and width of the resistor region 18. The value of the resistance of the region 18 is also a function of the resistivity of the epitaxial layer 16 which is conveniently in the range of about 0.5 ohm cm. to about 5.0 ohm cm.

A passivating insulating coating 25 is disposed on the surface 22 of the epitaxial layer 16. Preferably, the coating 25 is a conventionally formed thermal oxide of the semiconductive material of the body 12. A composite coating, such as a layer of silicon nitride on a layer of thermally grown silicon dioxide, may also be used. If desired, the surfaces of the body 12 other than the surface 22 may also have insulating coatings.

The sensor 10 has means for providing electrical contact to the resistor region 18 and for providing mechanical support for the body 12. This means comprises cantilevered beam leads 26 disposed on and adhered to the oxide coating 25 on the surface 22 of the body 12, with portions of the beam leads 26 extending through openings 27 in the oxide coating 25 into contact with the resistor region 18. The beam leads 26 include successive layers 28, 30, and 32 of titanium, platinum or palladium, and gold, respectively, and a reinforcing layer 34, also of gold. The size and shape of the contact openings 27 are matters of design which will influence the effective resistance of the region 18 in the same manner as is generally known for diffused resistors in the semiconductor integrated circuit art.

The sensor 10 may be made by conventional batch-fabrication methods. A typical process begins with a body or wafer of N type material, portions of which will constitute substrates for several of the sensors. An epitaxial layer 16 is grown on the wafer by, for example, the pyrolytic decomposition of silane ($SiH_4$) in known manner. Conductivity modifiers are introduced into the epitaxial layer during the growth period to adjust the resistivity of the epitaxial layer 16 to the desired level. The next step is to provide a diffusion masking coating on the surface of the epitaxial layer and to define this coating, photolithographically, so as to leave diffusion masking layers over the portions of the epitaxial layer which are to become the resistor regions 18. Conductivity modifiers are then introduced into the uncovered portions of the epitaxial layer to form the frame zones 20. The diffusion masking coatings are then removed and the insulating coating 25 is formed on the surface. Finally, the contact openings 27 are formed by known photolithographic processes and the beam leads 26 are conventionally made, as described, for example, in U.S. Pat. No. 3,426,252 to Lepselter. The wafer is then separated by conventional dicing techniques into the individual sensors 10.

The sensor 10 is shown mounted in a support 36 which may be a part of the apparatus in which the sensor 10 is to be used. In this example, the support 36 comprises a body 38 of insulating material having a recess 40 therein to accommodate the sensor 10. On the upper surface 42 of the body 38, conductive layers 44 and 46 are disposed. The beam leads 26 contact these conductive layers 44 and 46 to connect the resistor region 18 into conventional measuring circuitry, not shown.

As mentioned above, the device is particularly adapted for use in sensing changes in the rate of flow of a fluid such as air in the carburetor of an internal-combustion engine. When the device is used in this manner, the support 36 may be a part of the carburetor at a location where the upper surface of the sensor 10 may be exposed to the flow of air through the carburetor, indicated in FIG. 1 by the arrows 48. The external circuitry provides a current which flows through the resistor region 18, and the amount of current will vary as the temperature of the resistor region 18 varies as a result of changes in the flow rate of the fluid impinging on the sensor 10.

The manner of support of the sensor 10 by means of the beam leads 26 enhances the sensitivity of the device. The beam leads 26 support the sensor 10 out of contact with all but the fluid medium which is to be sensed. Consequently, the resistor responds well to changes in the temperature of the fluid itself and is relatively insensitive to changes in the temperature of the supporting medium.

The sensor 10 has a relatively high ratio of resistance change to temperature change which is attributable at least in part to the fact that the resistor region 18 is made of epitaxial material. The resistor region 18 may thus have uniform resistivity throughout its thickness with the consequence that its temperature coefficient of resistivity will be uniform throughout its thickness. As compared to a diffused resistor region which has varying resistivity throughout its thickness and relatively high surface concentration, the present device has a much higher temperature coefficient. The thickness and resistivity of the resistor region 18 can be established with accuracy in an epitaxial growth process. Further accuracy is achieved by the control over the effective length and width of the resistor, which is available from the photolithographic processes used to define the frame zone 20 and the contact openings 27.

While the sensor 10 has been described as having utility in a flowing fluid medium, it will be recognized that it may be used to measure the temperature of non-flowing fluids and of solids as well. The beam leads 26 may similarly provide low thermal loss support and hold the sensor 10 in contact with the medium to be measured.

When used in a fluid medium, the present sensor 10 is rugged and is adapted for use in high vibration environments, such as those which exist in an internal-combustion engine.

What is claimed is:

1. A semiconductor temperature sensor comprising:
    a body of semiconductive material having a region therein of uniform resistivity, and
    means for supporting said body and making electrical contact to said region comprising cantilevered beam leads connected to spaced areas of said region.

2. A semiconductor temperature sensor as defined in claim 1 wherein said region is rectangular, having predetermined length, width, and thickness.

3. A semiconductor temperature sensor as defined in claim 1 wherein said body comprises a substrate of one type conductivity and an epitaxial layer on said substrate, said region being of conductivity type opposite to that of said substrate and being a part of said epitaxial layer.

4. A semiconductor temperature sensor as defined in claim 3 wherein said body further comprises a frame zone of said one type conductivity in said epitaxial layer surrounding said region.

5. A semiconductor temperature sensor as defined in claim 4 wherein said epitaxial layer has a thickness between about 1 and 20 micrometers and said uniform resistivity is between about 0.5 and about 5.0 ohm centimeters.

6. A semiconductor temperature sensor as defined in claim 4 wherein said sensor is adapted to sense the temperature of a fluid medium, said beam leads providing the sole support for said body within said fluid medium.

7. A silicon temperature sensor for use in a flowing fluid medium for sensing changes in the rate of flow of said fluid medium comprising:
    a body of silicon having a surface and having therein adjacent to said surface a resistor region of uniform resistivity and predetermined length, width, and thickness,
    a layer of electrically insulating material on said surface, said layer having spaced openings therein adjacent to spaced areas of the surface of said resistor region, and
    means for supporting said body in contact with said flowing fluid medium, comprising beam leads adhered to said insulating material and having portions extending into said openings to contact said resistor region, said beam leads having other portions extending beyond the edges of said body.

8. A semiconductor temperature sensor as defined in claim 7 wherein said body comprises
    a substrate of one type conductivity having an epitaxial layer thereon, said resistor region being of conductivity type opposite to that of said substrate and being a part of said epitaxial layer, and
    a frame zone of said one type conductivity in said epitaxial layer in surrounding relation to said resistor region, said frame zone defining the length and width of said resistor region.

* * * * *